G. STICKELS.
SIGNAL CONTROL APPARATUS.
APPLICATION FILED JAN. 31, 1918.
1,293,970.
Patented Feb. 11, 1919.
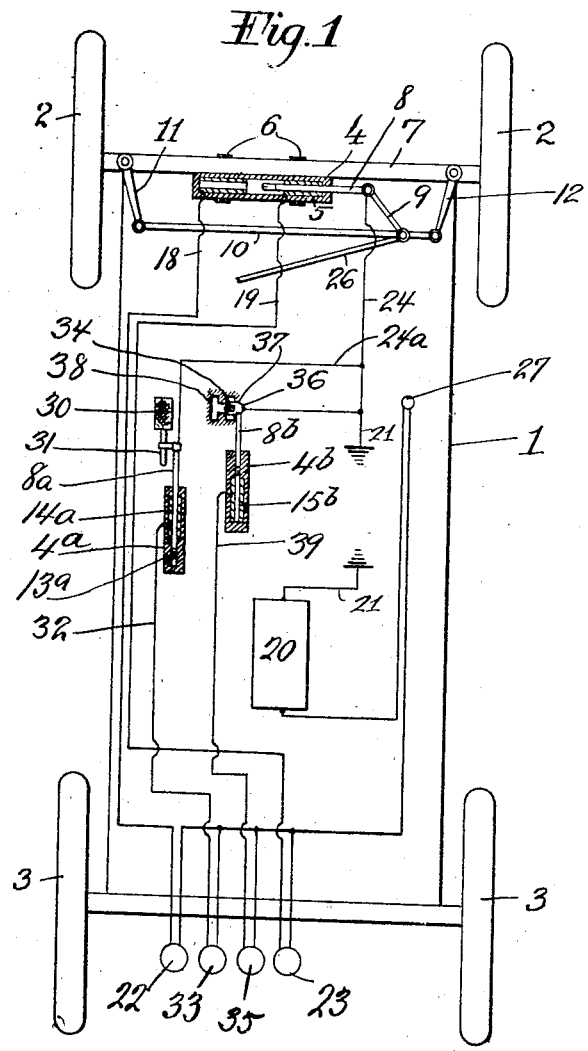
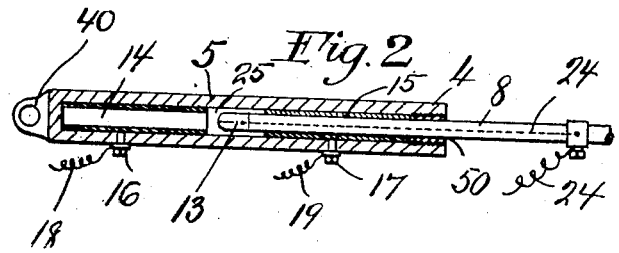
Inventor
George Stickels
By his Attorney
Henry J. Lucke

UNITED STATES PATENT OFFICE.

GEORGE STICKELS, OF ASTORIA, LONG ISLAND, NEW YORK.

SIGNAL-CONTROL APPARATUS.

1,293,970.          Specification of Letters Patent.          Patented Feb. 11, 1919.

Application filed January 31, 1918.   Serial No. 214,789.

*To all whom it may concern:*

Be it known that I, GEORGE STICKELS, a citizen of the United States of America, residing at Astoria, county of Queens, Long Island, State of New York, have invented certain new and useful Improvements in Signal-Control Apparatus, of which the following is a specification.

This invention relates to signaling apparatus and more particularly to signaling apparatus for a vehicle whereby the driver of another vehicle or a traffic officer, pedestrian, or the like may be apprised of the movement of the vehicle bearing the signaling apparatus.

The invention is especially directed to control and operate parts which are readily constructed, assembled and applied to the steering gear, foot and emergency brakes, reverse movement mechanism, etc., of the vehicle, and with the view of attaining positive coöperation of the desired signal indications.

The invention is also directed to control and operate parts constructed to be proof from dust, moisture and changes in atmospheric conditions, as well as "fool-proof" to acts of tampering by the operator of the vehicle or by meddling persons.

In the most preferred forms of the invention the control part comprises a cylindrical housing inclosing suitable contact elements and a relatively movable arm having provision of means for attachment to the steering gear, for example, of the vehicle, said arm having the contact element or plurality of elements coöperating with said first named contact element to close or control an electric circuit energizing the lamp or other indicator, to illuminate or otherwise indicate the movement of the vehicle, for example, "Right" or "Left", in all instances. Similar means are provided for the foot lever brake and the emergency brake to illuminate or actuate a "Slow" or "Stop" or equivalent indication; likewise for the reverse lever, the indication "Back" or equivalent.

Other features and objects of the invention are more fully described in the following description and the accompanying drawings, in which—

Figure 1 is a diagrammatic top plan view of an embodiment of the invention; and

Fig. 2 is a detail view of one form of control part of my invention, on a somewhat enlarged scale.

Referring to the drawings, the chassis is indicated by 1, the front wheels by 2, 2 and the rear wheels by 3, 3. In this embodiment of the invention, I have indicated the steering mechanism provided with a control part, the foot brake pedal with a similar control part and the reverse lever with a control part, the operated or indicating parts being preferably assembled as a unitary signaling device.

The control part 4 of the steering arrangement is shown having its housing 5 secured by suitable brackets 6, 6 to the front axle 7 of chassis 1. The movable element 8 of the control part 4, for the steering mechanism, is attached by the link 9 to the cross rod 10 connecting the knuckles 11, 12, of the two front wheels 2 respectively. The movable element 8 is provided with the contact 13 coöperating with the contacts 14, 15, to respectively indicate movement of the vehicle to the right or to the left as by the respective indications "Right" and "Left."

The aforesaid control part 4 is shown enlarged in Fig. 2, and may comprise the hollow, substantially cylindrical contacts 14, 15, respectively provided with the binding posts 16, 17 for attachment for the wires 18, 19, respectively. In the particular wiring arrangement shown in Fig. 1 utilizing the storage battery 20 of the starting or other electrically actuated device of the vehicle, or by a separate source of electrical energy, if desired, one terminal of the battery is grounded (indicated diagrammatically by the wiring 21). As shown, the wire 18 is connected with the electric bulb 22, for illuminating the indication "Right," whereas the wire 19 is connected with the bulb 23 for illuminating the indication "Left".

The movable element 8 of the control part 4 comprises a rod of insulation, through which traverses the electrical conductor 24 connecting with the movable contact 13. The movable contact 13 as shown may be a cylindrical contacting rod, split to insure maintenance of good contact. The contact 14 is located within the housing 5 and at a spaced distance from the contact 15 to provide an extent 25 of reciprocable movement of the contact 15 within the housing 4 through which extent of movement no indication is given, i. e., neither right nor left.

The purpose of this is to enable the operator to proceed "straight-ahead" by slight deflections in the forward movement of the machine, without confusing a driver of another vehicle, or other party by any right or left indication. Also, incident to wear and tear of the control mechanism, a sufficient play of the contact 13 should be allowed for. The exact spacial distance 25 between said contact 14 and said contact 15 will be determined in each particular instance of use.

The movable contact 13 is connected by the conductor 24 to the ground 21.

The steering wheel is connected by means of the steering link 26 to the cross rod 10, as in any approved arrangement.

The indication system is preferably provided with the pilot lamp 27 or equivalent, which is lighted or otherwise actuated when any indicator is set in indicating position. As shown, the pilot lamp 27 is connected in series with the respective indicating lamps, on one side of the battery 20.

Thus, upon movement of the steering arrangement either to the right or to the left, in excess of the clearance 25, either the indicating bulb 22 will be energized through the conductor 18 or the indicating bulb 23 through the conductor 19, the said circuits being respectively completed through the source 20, pilot lamp 27, ground 21 and the conductor 24.

Similar arrangement of indication is provided for the brake, such as the pedal brake 30, or emergency brake or equivalent. To the movable element, such as the lever 31, of the brake 30, I connect the reciprocable contact element 8ᵃ of the control part 4ᵃ, provided with one or more interior hollow contacts 14ᵃ. When an indication is desired in one direction of the control part of the vehicle, as in this instance of the pedal brake, one of the hollow contacts interior of the control part 4ᵃ may be omitted, or left "dead" as to any electrical connection.

The reciprocable element 8ᵃ is provided with the contact 13ᵃ and the hollow contact 14ᵃ is connected by the wire 32 with the indicating bulb 33, for illuminating or otherwise showing the indication "Stop" or "Slow" or equivalent. For purposes of simplicity of electrical connection, the indicating bulb 33 is connected in parallel with the aforesaid indicating bulbs 22, 23; also, the pilot lamp 27 is connected in series with the indicating bulb 33 to the source 20. The movable contact 13ᵃ is connected by the conductor 24ᵃ to "ground" 21.

Similarly, the speed control mechanism comprising a lever 34 is similarly provided with a control part 4ᵇ, and an operated part or indicating bulb 35. In the particular arrangement illustrated, the control part is arranged to give an indication when the speed control mechanism is moved into "reverse" whereby the indication "Back" is given.

In the specific embodiment, I have indicated the reciprocable element 8ᵇ provided with a lever 36 controlling the rod 8ᵇ, said lever having the fork 37 adapted to receive the control element 34 when moved in the H plate 38 to reverse position. The hollow contact 15ᵇ is connected by the conductor 39 with the indicator 35.

Similarly, other control elements of the vehicle may be provided with a control part having one or more internal, hollow contacts and the circuit arrangement thereof connected to effect corresponding indication of the movement of the control elements of the vehicle. The control part of my indication mechanism may be either strapped to a suitable fixed support by means of the strap 6, 6, or by means of an eye-lug 40, permitting pivotal movement of the casing 5 when required in certain instances of use.

The housing or casing 5 is preferably provided with a suitable sealing threaded closure 50. Upon removal of the closure 50, the interior contacts may be withdrawn to be repaired or replaced, or varied in adjustment of position within the casing or housing. The sealing means 50 precludes the entry of dust or other foreign substance into the housing or casing 5, upon reciprocation of the rod 8 supporting the movable contact 13. The housing of the control part and the supporting rod of the movable contacts are preferably of insulating material.

Whereas I have described my invention by reference to specific forms thereof, it will be understood that many changes and modifications may be made without departing from the invention, as defined by the appended claims.

I claim:

1. The combination with a control element of a vehicle, of a control part controlled by said control element comprising a closed housing having a sealable opening, one or more hollow contacts in said housing, a movable contact within said housing, and a reciprocable rod supporting said movable contact, said rod projecting into said housing through said suitable opening, and means connecting said rod with said control element.

2. The combination with a control element of a vehicle, of an indicator arrangement comprising a control part controlled by said control element and having a closed housing, said housing being provided with an opening, a hollow contact within said housing, a movable contact, a rod extending through said opening and supporting said movable contact, means for sealing said opening and means connecting said rod with said control element.

3. The combination with a control element of a vehicle, of an indicator arrangement comprising a control part controlled by said control element and having a closed housing, said housing being provided with an opening, a hollow contact within said housing, means for adjustably positioning said contact, a movable contact, a rod extending through said opening and supporting said movable contact, means for sealing said opening and means connecting said rod with said control element.

4. The combination with a control element of a vehicle, of an indicator arrangement comprising a control part controlled by said control element and having a closed housing, said housing having an opening, a plurality of spaced hollow contacts within said housing, a movable contact, a rod extending through said opening and supporting said movable contact, means for sealing said opening and means connecting said rod with said control element.

5. The combination with a control element of a vehicle, of an indicator arrangement comprising a control part controlled by said control element and having a closed housing, said housing having an opening, a plurality of spaced hollow contacts within said housing, means for adjustably positioning said contacts within said housing, a movable contact, a rod extending through said opening and supporting said movable contact, means for sealing said opening and means connecting said rod with said control element.

In testimony whereof I have signed this specification this 14th day of January, 1918.

GEORGE STICKELS.